United States Patent
Zhu et al.

(10) Patent No.: US 10,015,754 B2
(45) Date of Patent: Jul. 3, 2018

(54) METHOD, BASE STATION AND COMPUTER-READABLE STORAGE MEDIA FOR DOWNLINK POWER ALLOCATION IN A WIRELESS COMMUNICATION SYSTEM

(71) Applicant: Telefonaktiebolaget LM Ericsson (publ), Stockholm (SE)

(72) Inventors: Huaisong Zhu, Beijing (CN); Xinghua Song, Beijing (CN); Jianfeng Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 176 days.

(21) Appl. No.: 15/035,861

(22) PCT Filed: Nov. 27, 2013

(86) PCT No.: PCT/CN2013/087909
§ 371 (c)(1),
(2) Date: May 11, 2016

(87) PCT Pub. No.: WO2015/077931
PCT Pub. Date: Jun. 4, 2015

(65) Prior Publication Data
US 2016/0295525 A1 Oct. 6, 2016

(51) Int. Cl.
*G08C 17/00* (2006.01)
*H04W 52/30* (2009.01)
(Continued)

(52) U.S. Cl.
CPC .......... *H04W 52/30* (2013.01); *H04B 7/0617* (2013.01); *H04J 11/00* (2013.01);
(Continued)

(58) Field of Classification Search
USPC ................. 370/229, 230, 252, 311, 328, 329
See application file for complete search history.

(56) References Cited

U.S. PATENT DOCUMENTS 9,154,282 B2 * 10/2015 Nangia ................. H04L 5/0053
2008/0026744 A1 * 1/2008 Frederiksen .......... H04L 1/0026
455/425

(Continued)

FOREIGN PATENT DOCUMENTS

| CN | 101820669 A | 9/2010 |
|---|---|---|
| CN | 102118842 A | 7/2011 |
| CN | 102421178 A | 4/2012 |
| CN | 102572844 A | 7/2012 |
| CN | 102833793 A | 12/2012 |

*Primary Examiner* — Kwang B Yao
*Assistant Examiner* — Nguyen Ngo
(74) *Attorney, Agent, or Firm* — Sage Patent Group

(57) ABSTRACT

There are disclosed a method, base station and computer-readable storage media for downlink power allocation in a wireless communication system. The method may comprise obtaining information on positions of user equipments in a cell; classifying the user equipments into cell-edge user equipments and non-cell-edge user equipments based on the obtained information on the positions of user equipments in the cell; and performing downlink power allocation by increasing power allocated to at least one of physical downlink control channels (PDCCH) for scheduled user equipments of the cell-edge user equipments and common reference signals with power borrowed from at least one of downlink common channels for scheduled user equipments of the non-cell-edge user equipments. With embodiments of the present disclosure, downlink transmit power can be allocated efficiently and thus cell downlink coverage may be increased at a low cost.

15 Claims, 6 Drawing Sheets

(51) Int. Cl.

| | |
|---|---|
| *H04W 52/28* | (2009.01) |
| *H04W 52/32* | (2009.01) |
| *H04W 52/34* | (2009.01) |
| *H04B 7/06* | (2006.01) |
| *H04J 11/00* | (2006.01) |
| *H04L 5/00* | (2006.01) |
| *H04L 5/14* | (2006.01) |
| *H04W 72/04* | (2009.01) |
| *H04W 74/08* | (2009.01) |
| *H04W 52/14* | (2009.01) |
| *H04W 52/36* | (2009.01) |
| *H04W 52/50* | (2009.01) |
| *H04W 88/02* | (2009.01) |
| *H04W 88/08* | (2009.01) |

(52) U.S. Cl.
CPC ............... *H04L 5/005* (2013.01); *H04L 5/14* (2013.01); *H04W 52/283* (2013.01); *H04W 52/325* (2013.01); *H04W 52/343* (2013.01); *H04W 72/042* (2013.01); *H04W 72/0486* (2013.01); *H04W 74/0808* (2013.01); *H04W 52/143* (2013.01); *H04W 52/367* (2013.01); *H04W 52/50* (2013.01); *H04W 88/02* (2013.01); *H04W 88/08* (2013.01)

(56) References Cited

U.S. PATENT DOCUMENTS

| | | | |
|---|---|---|---|
| 2010/0210295 A1* | 8/2010 | Koc | H04W 52/146 455/522 |
| 2012/0008569 A1 | 1/2012 | Vrzic et al. | |
| 2012/0122512 A1* | 5/2012 | Nammi | H04W 52/243 455/522 |
| 2012/0163319 A1* | 6/2012 | Roessel | H04L 1/0003 370/329 |
| 2013/0090143 A1* | 4/2013 | Chang | H04W 72/042 455/509 |
| 2013/0183976 A1* | 7/2013 | Zhuang | H04W 48/20 455/436 |
| 2013/0235812 A1* | 9/2013 | Heo | H04L 5/001 370/329 |
| 2014/0106769 A1 | 4/2014 | Bai et al. | |
| 2014/0133426 A1* | 5/2014 | Liu | H04W 52/143 370/329 |
| 2015/0141014 A1* | 5/2015 | Huang | H04W 36/0061 455/436 |
| 2015/0305043 A1* | 10/2015 | Chmiel | H04W 52/346 370/329 |
| 2015/0319720 A1* | 11/2015 | Svedman | H04B 17/309 455/522 |
| 2017/0208584 A1* | 7/2017 | Qu | H04W 72/0413 |

\* cited by examiner

//015,754 B2

METHOD, BASE STATION AND COMPUTER-READABLE STORAGE MEDIA FOR DOWNLINK POWER ALLOCATION IN A WIRELESS COMMUNICATION SYSTEM

TECHNICAL FIELD

Embodiments of the present disclosure generally relate to wireless communication technologies, and more particularly relate to a method, base station and computer-readable storage media for downlink power allocation in a wireless communication system.

BACKGROUND

With the constant increase of mobile data services, the 3rd Generation Partnership Project (3GPP) organization has developed long-term evolution (LTE) specifications and LTE-Advanced (LTE-A) specifications and the LTE has been rapidly deployed by a number of operations worldwide. As the next generation cellular communication standard, the LTE or LTE-A system can operate in both Frequency Division Duplex (FDD) mode and Time Division Duplex (TDD) mode.

The LTE with TDD mode may also be called as a TD-LTE system. Due to channel reciprocity, the TD-LTE system has attracted more and more interests to obtain downlink beamforming gains with a large number of transmitter antennas. One of typical antennas deployments is to employ eight physical transmitter antennae on eNB side due to its excellent uplink receiving performance and relative good downlink beam forming performance. For the 8-antenna deployment, one of the most interesting topics is how to make such macro outdoor 8-antenna cover indoor users which generate most of LTE traffic. This lies in that the TD-LTE system employs a relatively higher carrier frequency, which could provide a larger bandwidth but a worse coverage than traditional GSM system, whereas building dedicated IBS (In building system) for indoor LTE converge is very expensive.

In outdoor-to-indoor scenario, to enable user equipment (UE) to access networks with extreme weak signal, for poor coverage points, the operator normally would set a basic requirement to ensure the UE to receive and correctly demodulate/decode the uplink and downlink common signals and channels. However, the basic requirement correctly demodulating/decoding constrains the cell coverage.

Generally, in TD-LTE system with 2-antenna, the cell coverage bottleneck is the uplink common signaling channel PRACH format 0 (i.e., random access channel) due to the UE power limitation, as illustrated in FIG. 1A. However, in TD-LTE system with 8-antenna, the downlink common signaling channels become the bottleneck for the cell coverage, just as illustrated in FIG. 1B. This lies in that the network side needs to send out the downlink common signaling channels to all UEs in a broadcasting way and thus more downlink transmission antennas can not provide more gains when the same transmission power is used.

To address the cell downlink coverage problem of the TD-LTE system with 8-antenna, two ways may be employed, i.e., increasing total downlink transmission power and performing power boosting on downlink common signaling channels. The increasing of total downlink transmission power is difficult to be implemented because required total output power is too high to be supported by current products due to extremely high component cost. The power boosting approach is a practical method by a flexible power allocation between the common signaling channels.

The power boosting may be performed on the CRS or downlink common channels. For a purpose of illustration, the flexible power allocation for downlink common channels and the common reference signal (CRS) resource elements (REs) is illustrated in FIG. 2, wherein CRS REs occupy specific fixed RE within each downlink time-frequency grid while the common channels would change according to the scheduled PDSCH loading.

As mentioned hereinabove, an option of power boosting approach is to increase power of CRS signals. The CRS signals are used by UEs to estimate downlink radio channels for coherent demodulation of downlink physical common channels. Furthermore, they are also used by UEs to acquire channel-state information (CSI) initial cell-selection and handover decisions. Thus, increasing the CRS transmission power can be helpful for UEs to obtain the better channel estimation, hence beneficial to the demodulation of all downlink common physical channels. However, in accordance with 3GPP specifications, the CRS REs power setting is carried by a system information type 2 with the information element referenceSignalPower. The system information type 2 has an updating periodicity of about 100 ms, which is too long to flexibly improve the cell coverage. This means the power of CRS REs can not be set flexibly with the traffic variation.

The other option is to perform downlink common channel power control. The increasing of the transmission power of downlink common channels may directly benefit these channels' demodulation due to increased power of received signal. However, if the downlink common channels are highly loaded especially in the cell edge, the network side has to increase the transmission power on a large fraction of downlink physical resource elements, which is hard to be supported by current terminal device due to a large power requirement.

Besides, in Chinese patent application publication No. CN102118842A titled "Downlink power control method and device applied to LTE system," there is proposed a downlink power control solution in a LTE system. In the proposed solution, power of the CRS signals are first determined, then based on the determined power for the CRS signals, power of the downlink physical channels are determined. It is clear that the solution proposed in the Chinese patent application publication also belongs to a downlink common channels power control approach as mentioned hereinabove and similarly it is involved in similar problems as well.

SUMMARY

To this end, the present disclosure provides a new solution for downlink power allocation in a wireless communication system so as to obviate or at least partially mitigate at least part of above problems.

In an aspect of the present embodiments, there is provided a method for downlink power allocation in a wireless communication system. The method comprises obtaining information on positions of user equipments in a cell; classifying the user equipments into cell-edge user equipments and non-cell-edge user equipments based on the obtained information on the positions of user equipments in the cell; and performing downlink power allocation by increasing power allocated to at least one of physical downlink control channels (PDCCH) for scheduled user equipments of the cell-edge user equipments and common reference signals with power borrowed from at least one of downlink common channels for scheduled user equipments of the non-cell-edge user equipments.

In an embodiment of the present disclosure, the downlink power allocation may be performed based on load information on control channels of user equipments in the cell. Especially, the load information on control channels of the user equipments in the cell may be represented by a ratio of the number of resource elements for control channels occupied by user equipments to the total number of resource elements for control channels available to user equipments.

In another embodiment of the present disclosure, the performing downlink power allocation may comprise initializing power of the common reference signals and the at least one of the downlink common channels for scheduled user equipments; and adjusting the initialized power so as to allocate more power to the at least one of the PDCCH for the scheduled user equipments of the cell-edge user equipments and the common reference signals.

In a further embodiment of the present disclosure, the adjusting the initialized power may be performed within a maximum available power constraint for downlink transmission, an upper bound constraint on the power of the PDCCH for the cell-edge user equipments, a lower bound constraint on the power of the at least one of downlink common channels for the non-cell-edge user equipments.

In a still further embodiment of the present disclosure, the adjusting the initialized power may comprise: determining the upper bound constraint on the power of the PDCCH for the cell-edge user equipments based on the initialized power of the common reference signals and power requirement of the PDCCH for the cell-edge user equipments; increasing the power of the PDCCH for the cell-edge user equipments gradually until the upper bound constraint on the power of the PDCCH for the cell-edge user equipments is broken; if the maximum available power constraint for downlink transmission is broken after increasing the power of the PDCCH for the cell-edge user equipments, decreasing the power of the at least one of downlink common channels for the non-cell-edge user equipments gradually until the lower bound constraint on the power of the at least one of downlink common channels for the non-cell-edge user equipments is broken; and if the maximum available power constraint for downlink transmission is still broken after decreasing the power of the at least one of downlink common channels for the non-cell-edge user equipments, increasing the power of the common reference signals by a predetermined adjustment amount and re-performing the adjusting the initialized power based on the increased power of the common reference signals.

In a yet embodiment of the present disclosure, the initialized power of the common reference signals may be increased by a predetermined value as a new initialized power of the common reference signals when the load information on control channels of the user equipments in the cell indicates a load higher than a predetermined load threshold.

In another aspect of the present embodiments, there is further provided a base station. The base station comprises a receiver unit; a transmitter unit; an information obtainment unit, a user equipment classification unit, and a power allocation unit. The information obtainment unit is configured to obtain information on positions of user equipments in a cell. The user equipment classification unit is configured to classify the user equipments into cell-edge user equipments and non-cell-edge user equipments based on the obtained information on the positions of user equipments in a cell. The power allocation unit is configured to perform downlink power allocation by increasing power allocated to at least one of physical downlink control channels (PDCCH) for scheduled user equipments of the cell-edge user equipments and common reference signals with power borrowed from at least one of downlink common channels for scheduled user equipments of the non-cell-edge user equipments.

In a further aspect of the present embodiments, there is also provided a computer-readable storage media having computer program code stored thereon. The computer program code is configured to, when executed, cause an apparatus to perform operations in the method according to the aspect of embodiments.

In embodiments of the present disclosure, the UEs in a cell will be classified into two different types based on their position information, i.e., cell-edge UEs and non-cell-edge UEs, and then with power borrowed from scheduled non-cell-edge UEs, power boosting is performed on at least one of PDCCH for scheduled cell-edge UEs and CRS signals. In such a way, downlink transmit power can be allocated more efficiently and thus cell downlink coverage, especially for poor overage points such as outdoor-to-indoor coverage, may be improved without increasing hardware cost. Additionally, the embodiments of the present disclosure do not require modifying the 3GPP specifications; it may be implemented at eNB side without modifying the UEs.

Other features and advantages of embodiments of the present disclosure will also be apparent from the following description of specific embodiments when read in conjunction with the accompanying drawings, which illustrate, by way of example, the principles of embodiments of the present disclosure.

BRIEF DESCRIPTION OF THE DRAWINGS

Embodiments of the disclosure are presented in the sense of examples and their advantages are explained in greater detail below, with reference to the accompanying drawings throughout which like reference numbers represent same or similar components and wherein.

DETAILED DESCRIPTION OF EMBODIMENTS

Hereinafter, embodiments of the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner. In the accompanying drawings, various embodiments of the present disclosure are illustrated in block diagrams, flow charts and other diagrams. Each block in the flowcharts or block diagrams may represent a module, a program, or a part of code, which contains one or more executable instructions for performing specified logic functions. It should also be noted that block diagrams and/or each block in the flowcharts may be implemented by a dedicated hardware-based system for performing specified functions/operations or by a combination of dedicated hardware and computer instructions.

Additionally, in a context of the present disclosure, a user equipment (UE) may refer to a terminal, a mobile terminal (MT), a subscriber station (SS), a portable subscriber station (PSS), mobile station (MS), an access terminal (AT), or other terminal device that may transmit and/or receive information through networks, and some or all of the functions of the UE, the terminal, the MT, the SS, the PSS, the MS, the AT, or terminal device may be included. Furthermore, in the context of the present disclosure, the term "BS" may represent, e.g., a node B (NodeB or NB), an evolved NodeB (eNodeB or eNB), a radio header (RH), a remote radio head (RRH), a relay, a low power node such as a femto, a pico, and so on, or any other node serving the UEs.

Hereinafter, reference will made to FIG. 3 to describe a method for downlink power allocation according to an embodiment of the present disclosure.

Figure 1A:
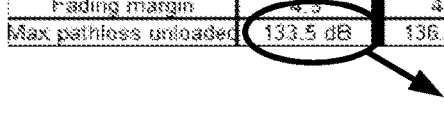
FIG. 1A schematically illustrates a diagram of link budgets for uplink and downlink common channels in a two-antenna TD-LTE system.
Figure 1B:
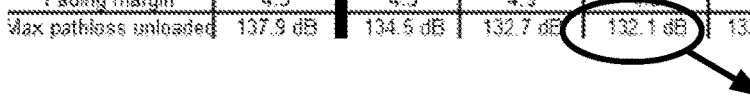
FIG. 1B schematically illustrates a diagram of link budgets for uplink and downlink common channels in an eight-antenna TD-LTE system.
Figure 2:
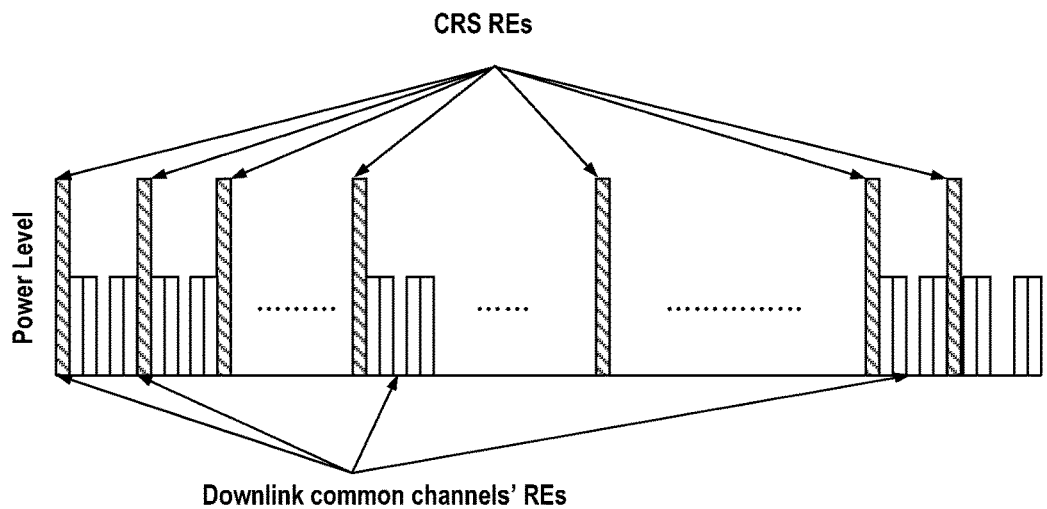
FIG. 2 schematically illustrates a scheme of power allocation for CRS and downlink common channels in prior art.
Figure 3:
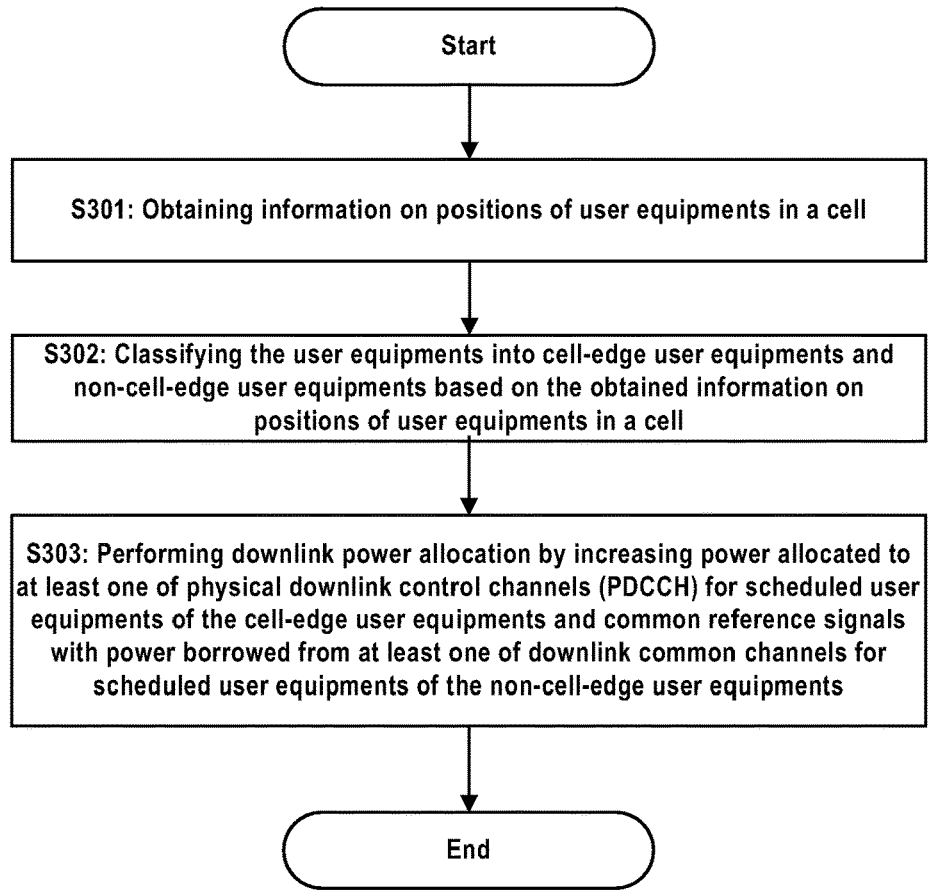
FIG. 3 schematically illustrates a flow chart of a method for downlink power allocation in a wireless communication system according to an embodiment of the present disclosure.

As illustrated in FIG. 3, first at step S301, the information on positions of UEs in a cell is obtained. Herein, the obtained information on positions of UEs will be used to classify user equipments into different types, for example, cell-edge user equipments or non-cell edges. In the present disclosure, the cell-edge user equipments mean user equipments located in poor coverage areas, that is to say, the cell-edge user equipments include not only user equipments geographically located far from a serving node but also those located in a poor coverage area of the central region (for example, those located in an area having many barriers, such as, indoor with a large penetration). Therefore, in embodiments of the present disclosure, the information on positions of user equipments is used to indicate whether the user equipments are located in poor coverage areas. As an example, the information on positions of user equipments may be represented by information on quality of received signals. It may be appreciated that a poor quality of received signals may reflect that the UE are located at a poor coverage area. The poor quality of received signal could be originated from for example, a large path-loss, a large geometry signal to interference-plus-noise ratio (SINR), large penetration, deep shadow fading, strong inter-cell interference, etc. Thus, the information on quality of received signal may be represented by for example path loss, geometry SINR, shadow fading and so on. In other embodiments of the present disclosure, the information on positions of user equipments may also be represented by time advance information of the user equipments. The time advance is a parameter for using in system temporal synchronization, which reflects the signal propagation time between a UE and a BS. It may be appreciated that a longer signal propagation time may indicate that the UE is geographically located far from a serving node. Thus, the time advance value may also be used as the information on positions of the UEs so as to classify the UEs. In addition, distance of the user equipments from their serving nodes, may also be used as a classification criterion. It may be appreciated that the farther the UE is located from its serving node, the worse the received signal quality is. Thus, the distance of the user equipments from their serving nodes, may also be used as a UE classification criterion especially when the cell is deployed in a relatively open area where no or few barriers are located.

It may be appreciated that the information on positions of the UEs may be obtained in various ways. Next, only for a purpose of illustration, the path-loss will be taken as an example for explaining the obtaining of the information on positions of the user equipments.

Due to channel reciprocity, the path-loss may be estimated form the signal strength/quality of UE's uplink channels. It is known in the art that the path-loss is measured based on the signal/quality of UE's uplink channels and thus it will be not be elaborated herein for a purpose of not obscuring the present disclosure.

Furthermore, the path-loss may also be obtained from UE measurements on the downlink channels. In such a case, the BS may transmit a measurement configuration for downlink power allocation to the UEs in advance so that UEs can learn that they are required to report measure information to the BS. The measurement configuration may be signaled to UEs via for example RRCConnectoinReconfiguration or any other suitable massage. The measurement configuration may be in any form as long as it may inform the UEs to report measurement information to the BS. In response to such a measurement configuration, each UE performs measurement and transmit a measurement report to the BS. However, it may be also noted that the measurement configuration may be omitted for example if user equipments has been designed in advance to perform measurement and transmit measurement report to the BS, For example, the path-loss may be obtained according to the measurement of Reference Signal Received Power (RSRP) and the known transmission power of the downlink common reference signals (i.e., CRS), which is broadcast by the eNB. The gap between RSRP and broadcast CRS power level may be denoted as the path-loss. In order to obtain a reasonable indication of the path-loss, the UE may filter the downlink path-loss estimate with a suitable time-window to remove the effect of fast fading. That is to say, the path-loss represents a large-scale channel fading. Besides, the UE may also send the RSRP to the eNB which may further determine the path-loss based on the RSRP and the CRS.

Then, based on the information on positions of the UEs, at step S302, the UEs may be classified into cell-edge UEs and non-cell-edge UEs. Hereinafter, for a purpose of illustration, the path-loss will be taken as an example again. In embodiments of the present disclosure, a predetermined classification threshold $\eta_{thrd}$ for the path-loss is provided. If a UE has a path-loss exceeding the predetermined classification threshold $\eta_{thrd}$, it will be classified into a cell-edge set $\Theta$; otherwise, it will be taken as a member of a non-cell-edge set $\overline{\Theta}$. In other words, the classification may be represented by, for example If $P_u \geq \eta_{thrd}$, then
u∈Θ;
else
u∈Θ̄
where $P_u$ denotes the path-loss of UE u.

Next at step S303, downlink power allocation is performed, wherein more power is allocated to at least one of physical downlink control channels for scheduled users equipments of the cell-edge user equipments and common reference signals with power borrowed from at least one of downlink common channels for scheduled user equipments of the non-cell-edge user equipments.

As mentioned in background, the transmission power is limited resource, however, the power boosting method in the prior art can not achieve the flexible cell coverage enhancement at the acceptable hardware complexity and cost. In embodiments of the present disclosure, to obtain enhanced cell coverage, the inventors contemplate to allocate power more efficiently among CRS, downlink common channels for scheduled cell-edge user equipments and downlink common channels for scheduled non-cell-edge user equipments. In a cell, when the same transmission power is used to transmit signals to UEs, the non-cell-edge UEs have excellent quality of received signals while the cell-edge UEs will have a poor quality of received signals. If the quality of received signals the non-cell-edge UEs is maintained at acceptable level with a reduced power, then the saved power may be used for cell coverage enhancement especially for the cell-edge UEs.

Therefore, in embodiments of the present disclosure, power can be borrowed from the downlink common channels for the non-cell-edge UEs and the borrowed power is used to increase at least one of CRS and PDCCH for the cell-edge UEs. Herein, term "borrow/borrowing power from the downlink common channels for the non-cell-edge UEs" means that less power are allocated to the downlink common channels for the non-cell-edge UEs compared to power allocated to the downlink common channels in the prior art.

In LTE release 8, there are three downlink common channels. The first one is physical control format indicator channel (PCFICH) which is used to inform the terminal device about the size of the control region (one, two, or three OFDM symbols) and there is one and only one PCFICH in each cell. The second one is physical downlink control channel (PDCCH) which is used to signal the downlink scheduling assignments and uplink scheduling grants and there may exist multiple PDCCHs in each cell. The third one is physical hybrid-ARQ indicator channel (PHICH) which is used to transmit the hybrid-ARQ acknowledgements in response to uplink UL-SCH transmissions and in each cell there may exist a plurality of PHICHs. Power may be borrowed from any one or more of the above three downlink common channels for non-cell-edge UEs. However, hereinafter, PDDCCH will be taken as an example as the downlink common channel from which power are borrowed to improve the cell coverage especially for those cell-edge UEs.

Figure 4:
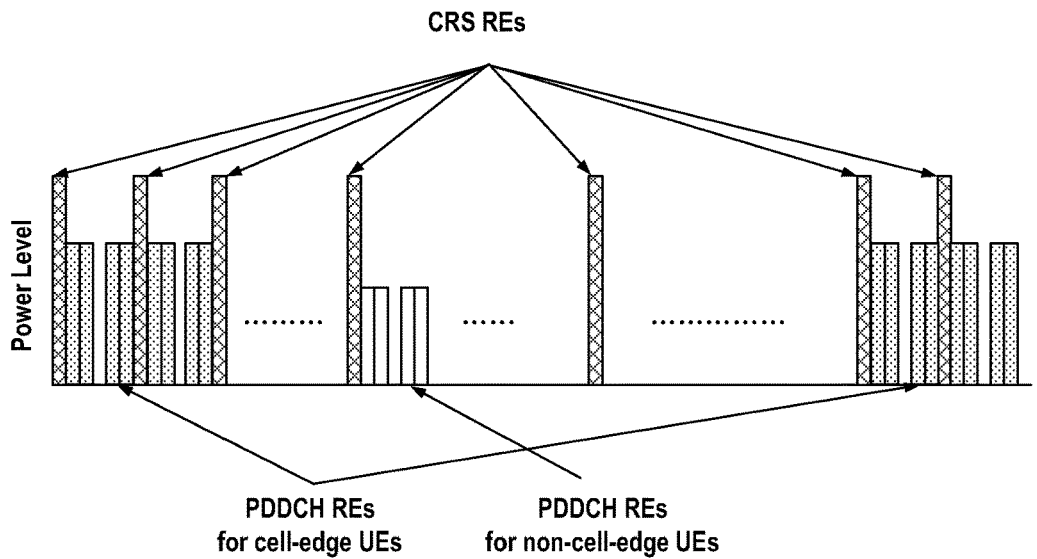
FIG. 4 schematically illustrates a scheme of power allocation for CRS and downlink common channels for cell-edge UEs and non-cell-edge UEs according to an embodiment of the present disclosure.

For a purpose of illustration, FIG. 4 schematically illustrates a scheme of power allocation for CRS and downlink common channels for cell-edge UEs and non-cell-edge UEs according to an embodiment of the present disclosure. As illustrated in FIG. 4, PDCCH REs for non-cell-edge UEs may be allocated less power than the PDCCH REs for cell-edge UEs and the CRS REs may also be allocated more power if necessary for example in a heavy load. In such a way, without increasing total transmit power, the cell coverage may be improved more efficiently while maintaining the acceptable received signal quality of the non-cell-edge user equipment.

Therefore, with the solution of the present disclosure, the non-cell-edge UEs may lend some of their power to cell-edge UEs or CRS and at the same time the received signal quality of non-cell-edge UEs is also acceptable. In such a way, more power may be used to perform power boosting to improve cell coverage. Furthermore, in the present disclosure, the power boosting on the CRS and power boosting on PDCCH for cell-edge UEs may be combined together to meet the overall converge requirement. Thus, the power may be allocated more efficiently and the cell coverage can be improved substantially without any hardware cost. Additionally, the embodiments of the present disclosure did not add any new signaling or configuration and thus they do not require modifying the 3GPP specifications and it may be implemented at eNB side without modifying the UEs.

Figure 5:
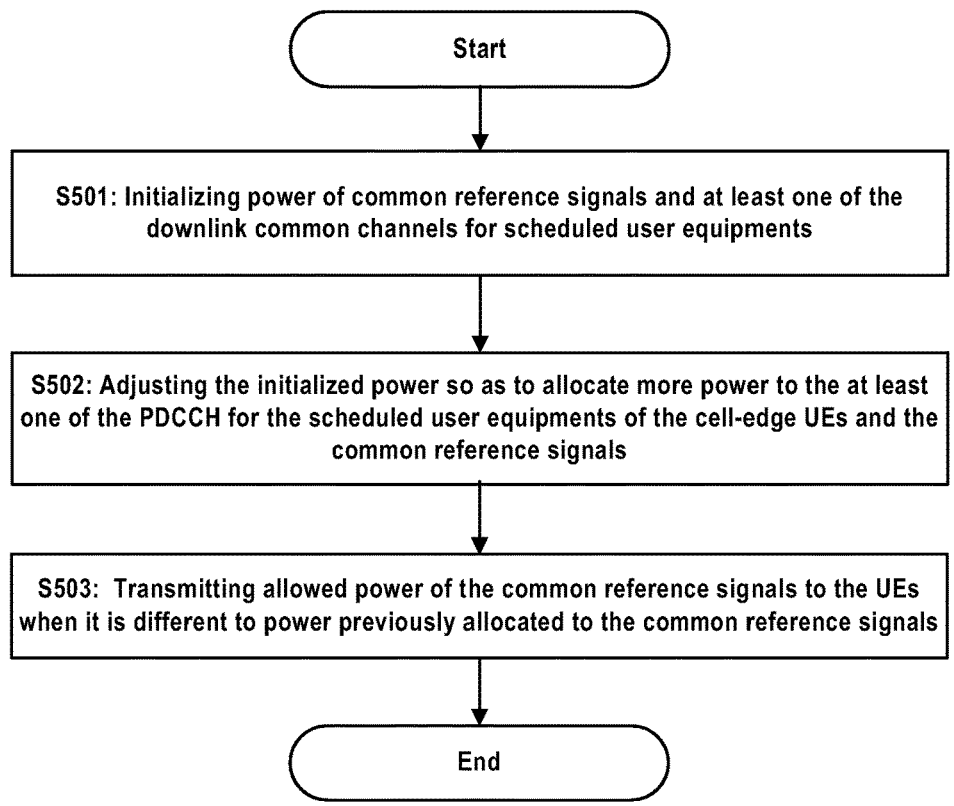
FIG. 5 schematically illustrates a flow chart of downlink power allocation on CRS and common channels according to an embodiment of the present disclosure.

For explaining the embodiments of the present disclosure more thoroughly and completely, FIG. 5 schematically illustrates a flow chart of downlink power allocation on CRS and the downlink common channels according to an embodiment of the present disclosure. As illustrated, at step S501, the power initialization will be performed, i.e., power of CRS and at least one of the down link common channels will be initialized to predetermined values.

The power of the CRS and the downlink common channels may be initialized to any suitable values, such as values just used in the prior art or values meeting minimum thresholds, etc. For example, downlink common channels for cell-edge UEs and non-cell-edge UEs may be initialized to a same power value and the CRS may initialized to a predetermined CRS power value. If the total allocated power is denoted by $P_{total\_alloc}$, the power allocated to PDCCH for the scheduled cell-edge UE k is denoted by $P_k$ wherein k is a member of the cell-edge sub-set K⊂Θ, the power allocated to the scheduled non-cell-edge UE k̄ is denoted by $P_{\bar{k}}$ wherein k̄ belongs to the non-cell-edge set K̄⊂Θ̄, the power allocated to CRS is denoted by $P_{CRS}$, and the power allocated to other downlink common channels including PHICH and PCFICH are $P_{HICFI}$, the total allocated power $P_{total\_alloc}$ may be denoted as $$P_{alloc\_total} = P_{CRS} + P_{HICFI} + \sum_{k \in K} P_k + \sum_{\bar{k} \in \bar{K}} P_{\bar{k}} \quad \text{Equation (1)}$$

In embodiments of the present disclosure, at the initializing step, the power of each channel or CRS could be conservative so as to avoid exceeding the maximum transmission power, i.e., the maximum power available for downlink transmission. Then in the next step S502, the initialized power will be further adjusted so that so as to allocate more power to the at least one of the PDCCH for the scheduled user equipments of the cell-edge user equipments and the common reference signals. That is, equation (1) will be updated with some further adjustment coefficients as $$P_{alloc\_total} = (P_{CRS} + \alpha \cdot \Delta P_{CRS}) + P_{HICFI} + \sum_{k \in K}(P_k + \beta \cdot \Delta P_K) + \sum_{\bar{k} \in \bar{K}}(P_{\bar{k}} + \gamma \cdot \Delta P_{\bar{K}}) \quad \text{Equation (2)}$$

wherein parameters α, β and γ are adjustment coefficients for transmission power allocated to CRS, PDCCH for scheduled cell-edge UEs and PDCCH for non-cell-edge UEs respectively, parameters $\Delta P_{CRS}$, $\Delta P_K$ and $\Delta P_{\overline{K}}$ denote the power adjustment step values for the CRS, the PDCCH of the scheduled cell-edge UEs and the PDCCH of the non-edge-cell UEs respectively. Parameters α, β and γ and parameters $\Delta P_{CRS}$, $\Delta P_K$ and $\Delta P_{\overline{K}}$ determine the time that a suitable power adjustment scheme is found and the granularity of the power adjustments. Large parameter values will cause a short adjustment time but a large adjustment granularity and small parameter values will lead to a long adjustment time and a small adjustment granularity. Therefore, these parameters may be considered as a compromise between the adjustment time and the adjustment granularity, and in practice they may be chosen based on specific application requirements.

The initialized power adjustment may be performed within a maximum available power constraint for downlink transmission, an upper bound constraint on the power of the PDCCH for the cell-edge user equipments, and a lower bound constraint on the power of the at least one of downlink common channels for the non-cell-edge user equipments. It may be appreciated that it should maintain the received signal quality of the non-cell-edge use acceptable while improving the cell coverage, and thus the lower bound constraint on the power of the at least one of downlink common channels for the non-cell-edge user equipments may be used to guarantee the received signal quality of the non-cell-edge user equipments. In addition, the transmission power is limited resource and it is not suitable to increase the power allocated to PDCCH for cell-edge UEs too much and it is enough if the power can meet the cell average requirements. Therefore, the upper bound constraint on the power of the PDCCH for the cell-edge user equipments may be set to ensure that only power meeting the cell coverage requirements will be allocated the PDCCH for the cell-edge user equipments.

Optionally, the adjustment may be further performed based on the load information on control channels of user equipments in the cell. The load information on control channels of the user equipments in the cell may be represented by a ratio of the number of resource elements for control channels occupied by user equipments to the total number of resource elements for control channels available to user equipments. When there is a lot of traffic, it will use more resource elements for control channels, and the load information will be represented by a high ratio value. For a special system load condition, for example a heavy load condition, it may perform a different operation. For example, if the loading information denotes a heavy load, i.e., a load higher than a predetermined load threshold, it means there are a lot of signals to be transmitted and the total power requirement may be large. In such a case, it may be advantageous if it may first increase, with power borrowed from PDCCH for scheduled non-cell-edge UEs, the power of the CRS by a predetermined value since even small CRS power increase will benefit all downlink common channels both for cell-edge user equipments and non-cell-edge user equipments. The amount of the predetermined value by may be higher than the adjustment amount (i.e. $\alpha \cdot \Delta P_{CRS}$) during power adjustment process so as to expedite the power adjustment speed. The resulting power of CRS may be taken as a new initialized power of CRS based on which the power adjustment is performed. In such a way, the power adjustment time may shorten greatly. However, it may be understand it is also feasible if the CRS is not increased based on the loading information since the CRS will also be adjusted in power adjustment process but at a slow speed.

Then, based on the initialized power of CRS and the power requirement of the PDCCH for the cell-edge user equipments, it may determine the upper bound constraint on the power of the PDCCH for the cell-edge user equipments. It may be appreciated that power boosting on CRS will benefit all downlink common channels for all user equipments, i.e., improving overall cell coverage. Thus transmit power of the PDCCH for the cell-edge user equipments that can meet the cell coverage requirement will be different when the power of CRS is changed. A table may be established in advance by experiments, tests or in other manners, which may comprise a lots of entries each containing coverage requirement, CRS power, corresponding transmit power and etc By looking up the table, the upper bound constraint on the power of the PDCCH for the cell-edge user equipments may be determined. It should be noted that the table may also be replaced by any other forms, for example curves showing the relationship among coverage requirement, CRS power, and transmit power requirement.

Then, the power of the PDCCH for the cell-edge user equipments may be increased gradually until the upper bound constraint on the power of the PDCCH for the cell-edge user equipments is broken. Then, if the maximum available power constraint for downlink transmission is broken after increasing the power of the PDCCH for the cell-edge user equipments, the power of the at least one of downlink common channels for the non-cell-edge user equipments may be decreased gradually until the lower bound constraint on the power of the at least one of downlink common channels for the non-cell-edge user equipments is broken. After decreasing the power of the at least one of downlink common channels for the non-cell-edge user equipments, if the maximum available power constraint for downlink transmission is still broken, the power of the common reference signals may be increased by a predetermined adjustment amount. Next, power adjusting may be re-performed based on the increased power of the common reference signals. The power of downlink common channels based on which the power adjusting is performed is the power of downlink common channels initialized during the power initializing process. The process may continue till the cell coverage requirement is met and the total allocated power is not higher than the maximum available transmit power.

Then at step S503, the allocated power to the CRS signals may be transmitted to the UEs when it is different to power previously allocated to CRS signals. That is to say, only when the power allocated to the CRS is changed, the power of CRS signals are updated to the UEs and if it does not change, it does not require power updating. However, it should be noted that the transmission of the power allocated to CRS signals may also be performed regardless of power's change, that is to say, it is possible to transmit the allocated power to CRS signals to the UEs even though the allocated power to CRS signals does not change.

Besides, all downlink common channels are modulated with the same modulation scheme, i.e., QPSK, which means the amplitude information is not needed for UE to demodulate these downlink common channels when the power boosting is performed. Therefore, it is not required to transmit the allocated power of downlink common channels to the UEs.

Figure 6:
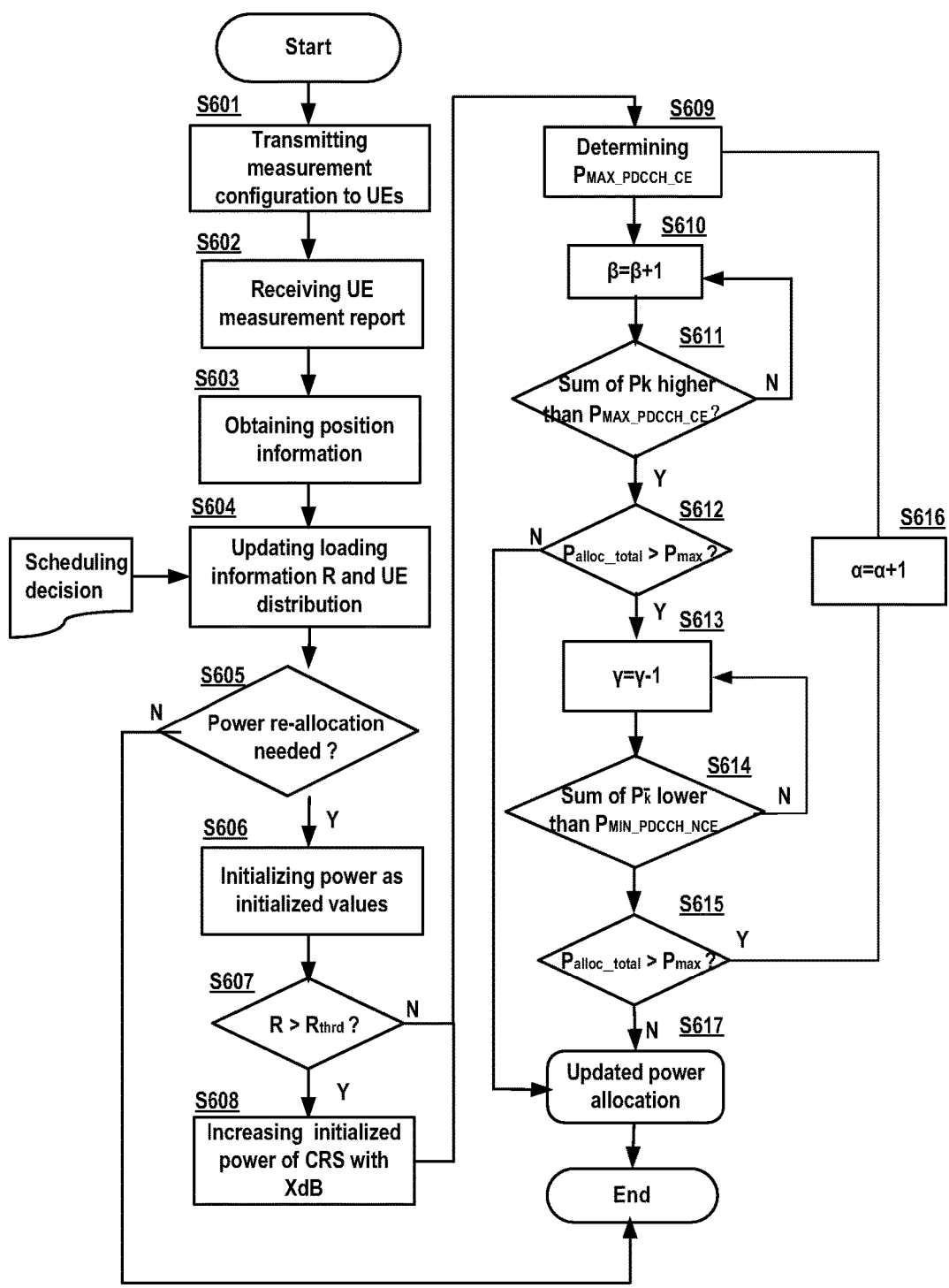
FIG. 6 schematically illustrates a flow chart of downlink power allocation in a wireless communication system according to a specific implementation of the present disclosure.

For a purpose of illustration, FIG. 6 schematically illustrates a flow chart of downlink power allocation in a wireless communication system according to a specific implementation of the present disclosure. As illustrated in FIG. 6, first at step S601, the eNB transmits a measurement configuration to the UEs in the cell. In response to the measurement configuration, the UEs will transmit their respective measurement reports to the eNB. The eNB receives the measurement reports at step S602 and, at step S603, it obtains position information of UEs from the receiver measurement reports, such as their respective path-loss, geometry SINR, time advance values, and their distance from a serving node, etc. At step S604, the UE updates the distribution of UEs based on the received position information and when the scheduling decision indicates that at least one of cell-edge UEs is scheduled, the eNB may update the loading information of UEs It may be appreciated that the eNB could learn all scheduling information, including all scheduled UE's traffic and based on the UE's traffic, it may determine how many resource elements for control channels should be occupied by the UEs. Thus, based on the number of occupied resource elements for control channels and the total number of resource elements for control channels available to user equipments which is known system value, it may determine the load information, for example a ratio of the number of occupied resource elements for control channels to the total number of available resource elements for control channels.

Then at step S605, it determines whether power-reallocation is needed, i.e., whether the power allocation proposed in the present disclosure is needed. For example, if it determines that required transmission power is larger than the maximum available power constraint for downlink transmission $P_{max}$, or in other word, the maximum available power constraint for downlink transmission $P_{max}$ fails to meet the overall coverage requirement, then it requires a power re-allocation and the process goes to step S606. Otherwise, if it determines that no power re-allocation is needed, the process is ended.

At step S606, the power initialization will be performed. For example, power of CRS, PDCCH for scheduled cell-edge UEs and PDCCH for scheduled non-cell-edge UEs will be set as for example predetermined values as their respective initialized power values. Afterwards, it determines at step S607, whether the load information indicates a heavy system load condition, i.e., whether the load R indicated by the load information is higher than a load threshold $R_{th}$, for example 90% or any other suitable threshold. If the load R is higher than the load threshold $R_{th}$, then at step S608 the initialized power of CRS may be increased by a predetermined amount, for example 5 dB, as a new initialized power of CRS and then the process enters step S609. At step S609, the eNB may determine the upper bound constraint on the power of the PDCCH for the cell-edge user equipments $P_{MAX-PDCCH\_CE}$. Herein, the upper bound constrain $P_{MAX-PDCCH\_CE}$ refers to a power of the PDCCH for the cell-edge user equipments that can meet the cell-edge coverage requirement. The upper bound is related to both the cell coverage requirement and the power allocated to the CRS. It may be appreciated that a larger cell coverage requirement will cause a higher $P_{MAX-PDCCH\_CE}$ value, and more power allocated to the CRS will cause a lower $P_{MAX-PDCCH\_CE}$ value.

After the $P_{MAX-PDCCH\_CE}$ value is determined, it may increase the power allocated to the PDCCH of scheduled cell-edge UEs until the power allocated to the PDCCH of scheduled cell-edge UEs has reached the $P_{MAX-PDCCH\_CE}$ value (step S610 and S611).

Then at step S612, it determines whether the total allocated power $P_{alloc\_total}$ is higher than the maximum available power for downlink transmission $P_{MAX}$. If it is not, then the process goes into step S617, the power allocated is updated and the process is ended. Otherwise, at steps S613 and S614, the initialized power of PDCCH of scheduled non-cell-edge UEs may be decreased until the adjusted power of PDCCH of scheduled non-cell-edge UEs reaches its lower power bound $P_{MIN\_PDCCH\_NCE}$.

Then it will check at step S615 whether the total allocated power $P_{alloc\_total}$ is still higher than the maximum available power for downlink transmission $P_{MAX}$. If not, the process proceeds into step S617; otherwise, the process enters step S616 at which the power allocated to the CRS will be increased by a predetermine amount and then at step S609 the upper bound constrain $P_{MAX-PDCCH\_C}$ will be determined again based on new allocated power of CRS and steps S610 to S615 may be repeated until the total allocated power $P_{alloc\_total}$ is not higher than the maximum available power constraint for downlink transmission $P_{MAX}$.

Figure 7:
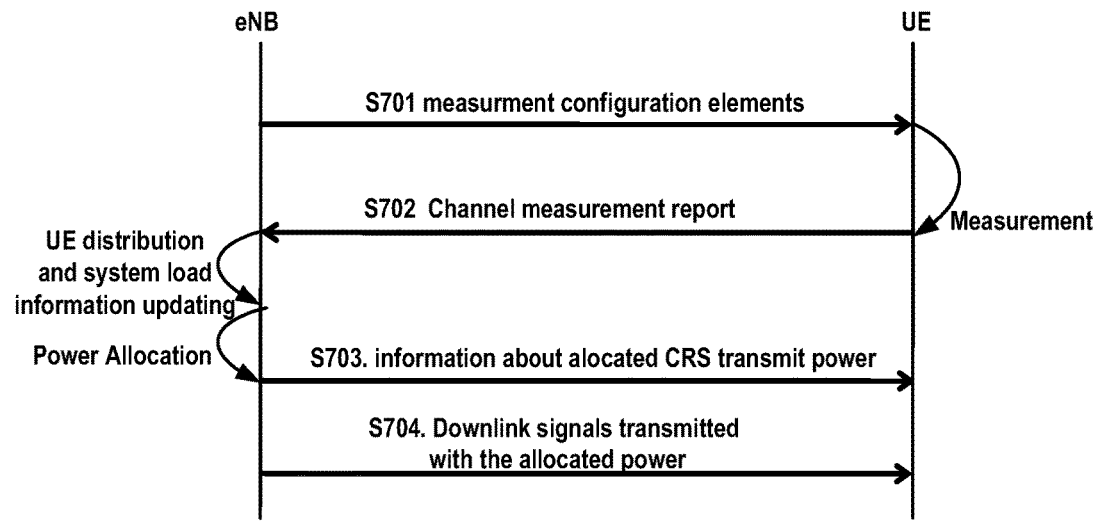
FIG. 7 schematically illustrates an exemplary signaling flow diagram for downlink power allocation in a wireless communication system according to an embodiment of the present disclosure.

Besides, FIG. 7 schematically illustrates an exemplary signaling flow diagram for downlink power allocation in a wireless communication system according to an embodiment of the present disclosure.

First, at step S701, the eNB transmits the measurement configuration elements to the UE via, for example, an RRCConnectionReconfiguration message. In response to such a configuration message, the UE performs channel measurement at step S702 and transmits a measurement report to the eNB at step S703. The eNB updates the UE distribution and system load based on the measurement report at step S704 and performs power allocation as described hereinabove at step S705. Then, when the power allocated to the CRS is different from the previous one, information about updated CRS transmit power will be transmitted from the eNB to the UE via, for example, system information broadcasting (step S706). As mentioned hereinabove, information on other allocated power is not required to transmit since all downlink common channels are modulated with the same modulation scheme. Thus at step S707, the eNB may transmit downlink signals at downlink common channels with their respective updated power.

Figure 8:
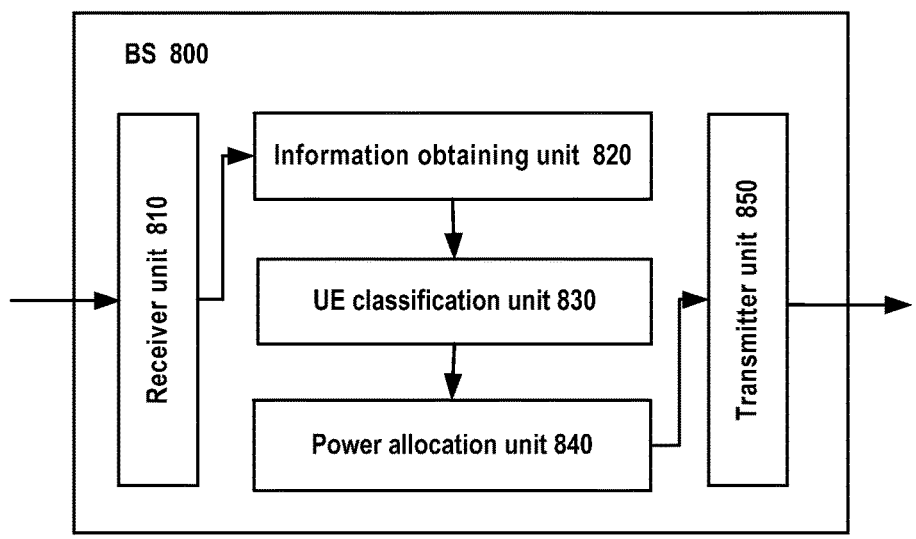
FIG. 8 schematically illustrates a block diagram of a base station according to an embodiment of the present disclosure.

FIG. 8 schematically illustrates a block diagram of a base station according to another embodiment of the present disclosure, wherein the base station may perform the power allocation as mentioned above. As illustrated in FIG. 8, the base station 800 comprises a receiver unit 810, an information obtainment unit 820, a user equipment classification unit 830, a power allocation unit 840 and a transmitter unit 850. The receiver unit 810 is configured to receive signals from user equipments. The information obtainment unit 820 is configured to obtain the information on positions of user equipments in a cell, for example based on the measurement report received through the receiver unit 810. The user equipment classification unit 820 is configured to classify the user equipments into cell-edge user equipments and non-cell-edge user equipments based on the obtained information on the positions of user equipments in a cell. The power allocation unit 840 is configured to perform downlink power allocation by increasing power allocated to at least one of physical downlink control channels (PDCCH) for scheduled user equipments of the cell-edge user equipments and common reference signals with power borrowed from at least one of downlink common channels for scheduled user equipments of the non-cell-edge user equipments. The transmitter unit 850 may be configured to transmit CRS signals and downlink signals over the downlink common channels with the allocated power.

Optionally, in embodiments of the present disclosure, the power allocation unit 840 may be further configured to perform the downlink power allocation based on load information on control channels of user equipments in the cell. The load information on control channels of the user equipments in the cell may be represented by a ratio of the number of resource elements for control channels occupied by user equipments to the total number of resource elements for control channels available to user equipments.

Figure 9:
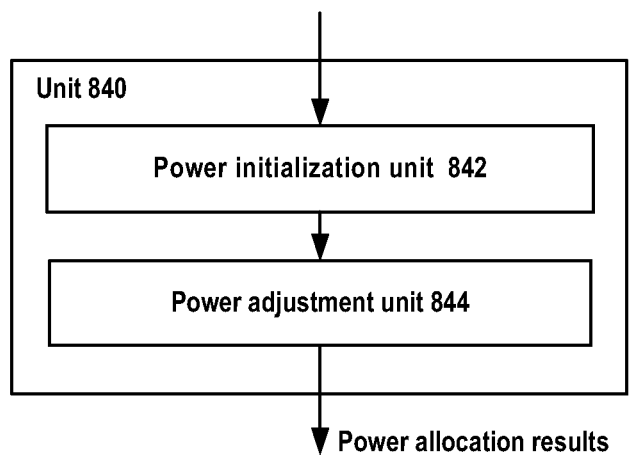
FIG. 9 schematically illustrates a block diagram of a power allocation unit comprised in the base station according to an embodiment of the present disclosure.

FIG. 9 schematically illustrates a block diagram of power allocation unit 840 as comprised in the base station according to an embodiment of the present disclosure. As illustrated in FIG. 9, the power allocation unit 840 may further comprise a power initialization unit 842 and a power adjustment unit 844. The power initialization unit 842 may be configured to initialize power of the common reference signals and the at least one of the downlink common channels for scheduled user equipments. The power adjustment unit 844 may be configured to adjust the initialized power so as to allocate more power to the at least one of the PDCCH for the scheduled user equipments of the cell-edge user equipments and the common reference signals.

Besides, the power adjustment unit 844 is configured to adjust the initialized power within a maximum available power constraint for downlink transmission, an upper bound constraint on the power of the PDCCH for the cell-edge user equipments, and a lower bound constraint on the power of the at least one of downlink common channels for the non-cell-edge user equipments. Especially, the power adjustment unit 844 may be configured to determine the upper bound constraint on the power of the PDCCH for the cell-edge user equipments based on the initialized power of the common reference signals and power requirement of the PDCCH for the cell-edge user equipments.

The power adjustment unit 844 may be configured to increase the power of the PDCCH for the cell-edge user equipments gradually until the upper bound constraint on the power of the PDCCH for the cell-edge user equipments is broken; if the maximum available power constraint for downlink transmission is broken after increasing the power of the PDCCH for the cell-edge user equipments, decrease the power of the at least one of downlink common channels for the non-cell-edge user equipments gradually until the lower bound constraint on the power of the at least one of downlink common channels for the non-cell-edge user equipments is broken; and if the maximum available power constraint for downlink transmission is still broken after decreasing the power of the at least one of downlink common channels for the non-cell-edge user equipments, increase the power of the common reference signals by a predetermined adjustment amount and re-perform the adjusting the initialized power based on the increased power of the common reference signals.

Besides, the power adjustment unit 844 may be further configured to increase the initialized power of the common reference signals by a predetermined value as a new initialized power of the common reference signals when the load information on control channels of the user equipments in the cell indicates a load higher than a predetermined threshold.

In embodiments of the present disclosure, the transmitter unit 810 may be configured to transmit information on the power allocated to the common reference signals to the user equipments when it is different to power previously allocated to the common reference signals. Furthermore, it may be configured to transmit a measurement configuration for the downlink power allocation to the user equipments in the cell.

It should be appreciated that due to the fact that operations of the information obtaining unit 820, the user equipment classification unit 830 and the power allocation unit 840 are already described in details hereinabove with regard to the method proposed in the present disclosure, detailed operations of these units are omitted for a purpose of simplification. For more details about these operations, reference may be made to description with regard to the proposed method.

Figure 10:
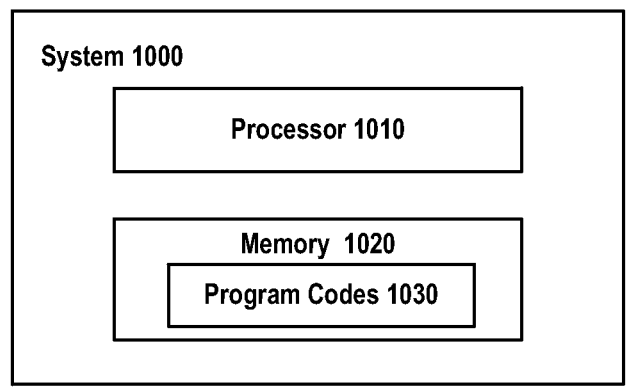
FIG. 10 schematically illustrates a system for downlink power allocation in a wireless communication system.

Besides, FIG. 10 schematically illustrates a system for downlink power allocation in a wireless communication system. The system 1000 may at least one processor 1010 and at least one memory 1020 including computer program code 1030. The at least one memory 1020 and the computer program code 1030 can be configured to, with the at least one processor 1010, cause an apparatus to perform the method as proposed in the present disclosure. It may be appreciated that the system 1000 may be a whole system in a base station, which comprises at least one processor and at least one memory further containing computer program code for performing the proposed method herein. Or alternatively, it may be a separate system newly incorporated into the existing system in the base station, which comprises at least one processor and at least one memory containing computer program code for performing the proposed method herein.

Besides, it may be also appreciated that all these units described herein may be implemented in the processor 1010, a receiver or a transmitter, which is dependent on respective operations of these units. For example, it is possible to implement the information obtainment unit 820 by a receiver, that is to say, the receiver may be configured to receive the information on positions of UEs in a cell, while the UE classification unit 830 and the power allocation unit 840 may implemented in the processor 1010.

Furthermore, in some instances, detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present disclosure may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

By far, embodiments of the present disclosure have been described with reference to the LTE-TD system; however, it should be appreciated that the present disclosure is not limited thereto and it may be also applicable to any other system (such as LTE-FDD system, etc.) wherein the transmit power capacity fails to meet cell coverage requirement and which may benefit from the solution as proposed herein. Besides, in embodiments of the present disclosure, the power allocation solution is proposed for 8-antenna system, but it does not limited thereto and it may used to any antenna system having similar problems.

Hereinabove, the path-loss is taken as an example of information on positions of UEs to describe the information obtaining and the user equipment classification but the present disclosure is not limited thereto. From the teaching given herein, the skilled in the art may readily learn how to obtain other parameters (such as geometry SINR, TA values, distance of UEs from a serving node, etc.) that can be used to represent the information on positions of UEs and how to classify UEs based on these parameters.

Besides, embodiments wherein power is borrowed form the PDCCH for non-cell-edge UEs are described in detail, however, the present disclosure is not limited thereto. Actually, alternatively or additionally, in the present disclosure, the power used for cell coverage enhancement may also be borrowed from one or more of any other downlink common channels, such as PHICH and PCFICH.

In embodiments of the present disclosure, specific schemes for power allocation have been described with reference to FIGS. 5 and 6. However, it should be noted that these descriptions are only for a purpose of illustration and the present disclosure is not limited thereto. Actually, based on the idea proposed herein, the skilled in the art could conceive many other schemes for power allocation. For example, during decreasing the power of PDCCH of non-cell-edge UEs, each time before the γ is increased, it may further determined whether the total allocated power is higher than the maximum available power, if not then the process may be ended. Besides, during the power adjustment, the power of CRS may also be directly increase to its upper bound and the power of PDCCH of non-cell-edge UEs may be decreased to its lower bound without increasing or decreasing gradually.

In addition, the following power allocation scheme may also be feasible as an alternative scheme. In the power allocation scheme, the power of the PDCCH for the cell-edge user equipments is first increased gradually under the maximum available power constraint for downlink transmission and the upper bound constraint on the power of the PDCCH for the cell-edge user equipments. If only the upper bound constraint on the power of the PDCCH for the cell-edge user equipments is broken and the allocated power is updated and the process is ended because the cell-edge coverage requirement is met within the maximum available power constraint for downlink transmission. If the maximum available power constraint for downlink transmission is broken and the upper bound constraint on the power of the PDCCH for the cell-edge user equipments is not broken, the power of the at least one of downlink common channels for the non-cell-edge user equipments is decreased gradually and at the same time the power of the PDCCH for the cell-edge user equipments is increased gradually with power saved by the above-mentioned power decreasing until the lower bound constraint on the power of the at least one of downlink common channels for the non-cell-edge user equipments is broken or the upper bound constraint on the power of the PDCCH for the cell-edge user equipments. If the upper bound constraint on the power of the PDCCH for cell-edge user equipments is broken, then the allocated power may be updated and the process is ended. Otherwise, if the upper bound constraint on the power of the PDCCH for cell-edge user equipments is not broken but the lower bound constraint on the power of the at least one of downlink common channels for the non-cell-edge user equipments is broken, the power of the common reference signals is increased by a predetermined value and the power adjustment is repeated based on the new increased power of the CRS.

Based on the above description, the skilled in the art would appreciate that the present disclosure may be embodied in an apparatus, a method, or a computer program product. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Besides, various blocks shown in the accompanying drawings may be viewed as method steps, and/or as operations that result from operation of computer program code, and/or as a plurality of coupled logic circuit elements constructed to carry out the associated function(s).

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for downlink power allocation in a wireless communication system, the method comprising:
   obtaining information on positions of user equipments in a cell;
   classifying the user equipments into cell-edge user equipments and non-cell-edge user equipments based on the obtained information on the positions of user equipments in the cell; and
   performing downlink power allocation by increasing power allocated to at least one of physical downlink control channels (PDCCH) for scheduled user equipments of the cell-edge user equipments and common reference signals with power borrowed from at least one downlink common channel for scheduled user equipments of the non-cell-edge user equipments;
   wherein the downlink power allocation is performed based on load information on control channels of user equipments in the cell; and wherein the load information on control channels of the user equipments in the cell is represented by a ratio of the number of resource elements for the control channels occupied by user equipments to the total number of resource elements for control channels available to user equipments.

2. The method of claim 1, wherein the performing downlink power allocation comprises:
   initializing power of the common reference signals and the at least one downlink common channel for scheduled user equipments; and
   adjusting the initialized power so as to allocate more power to the at least one of the PDCCH for the scheduled user equipments of the cell-edge user equipments and the common reference signals.

3. The method of claim 2, wherein the initialized power of the common reference signals is increased by a predetermined value as a new initialized power of the common reference signals when the load information on control channels of the user equipment's in the cell indicates a load higher than a predetermined load threshold.

4. The method of claim 1, further comprising transmitting information on the power allocated to the common reference signals to the user equipment's when it is different to power previously allocated to the common reference signals.

5. The method of claim 1, further comprising transmitting a measurement configuration for the downlink power allocation to the user equipments in the cell.

6. The method of claim 1, wherein the information on the positions of user equipment's in the cell is obtained based on the channel measurement information from the user equipment's in the cell.

7. The method of claim 1, wherein the at least one downlink common channel comprises the PDCCH.

8. The method of claim 1, wherein the information on the positions of user equipments in the cell is represented by any one of:
   path loss;
   geometry signal to interference-plus-noise ratio (SINR);
   timing advance information for the user equipments; and
   distance of the user equipments from their serving node.

9. A method for downlink power allocation in a wireless communication system, the method comprising:
   obtaining information on positions of user equipments in a cell;
   classifying the user equipments into cell-edge user equipments and non-cell-edge user equipments based on the obtained information on the positions of user equipments in the cell; and
   performing downlink power allocation by increasing power allocated to at least one of physical downlink control channels (PDCCH) for scheduled user equipments of the cell-edge user equipments and common reference signals with power borrowed from at least one downlink common channel for scheduled user equipments of the non-cell-edge user equipments;
   wherein the downlink power allocation is performed based on load information on control channels of user equipments in the cell;
   wherein performing downlink power allocation comprises:
   initializing power of the common reference signals and the at least one downlink common channel for scheduled user equipments; and
   adjusting the initialized power so as to allocate more power to the at least one of the PDCCH for the scheduled user equipments of the cell-edge user equipments and the common reference signals; and
   wherein the adjusting the initialized power is performed within a maximum available power constraint for downlink transmission, an upper bound constraint on the power of the PDCCH for the cell-edge user equipments, and a lower bound constraint on the power of the at least one downlink common channel for the non-cell-edge user equipments.

10. The method of claim 9, wherein the adjusting the initialized power comprises:
    determining the upper bound constraint on the power of the PDCCH for the cell-edge user equipment's based on the initialized power of the common reference signals and power requirement of the PDCCH for the cell-edge user equipments;
    increasing the power of the PDCCH for the cell-edge user equipments gradually until the upper bound constraint on the power of the PDCCH for the cell-edge user equipment's is broken;
    if the maximum available power constraint for downlink transmission is broken after increasing the power of the PDCCH for the cell-edge user equipments, decreasing the power of the at least one downlink common channel for the non-cell-edge user equipments gradually until the lower bound constraint on the power of the at least one downlink common channel for the non-cell-edge user equipments is broken; and
    if the maximum available power constraint for downlink transmission is still broken after decreasing the power of the at least one downlink common channel for the non-cell-edge user equipment's, increasing the power of the common reference signals by a predetermined adjustment amount and re-performing the adjusting the initialized power based on the increased power of the common reference signals.

11. A base station, comprising:
    a receiver circuit;
    a transmitter circuit;
    an information obtainment circuit configured to obtain information on positions of user equipments in a cell;
    a user equipment classification circuit configured to classify user equipments into cell-edge user equipment's and non-cell-edge user equipment's based on the obtained information on the positions of user equipments in the cell; and
    a power allocation circuit configured to perform downlink power allocation by increasing power allocated to at least one of physical downlink control channels (PDCCH) for scheduled user equipments of the cell-edge user equipments and common reference signals with power borrowed from at least one of downlink common channels for scheduled user equipments of the non-cell-edge user equipments;
    wherein the power allocation circuit is configured to perform the downlink power allocation based on load information on control channels of user equipments in the cell;
    wherein the power allocation circuit comprises:
    a power initialization circuit configured to initialize power of the common reference signals and the at least one downlink common channel for scheduled user equipments; and
    a power adjustment circuit configured to adjust the initialized power so as to allocate more power to the at least one of the PDCCH for the scheduled user equipments of the cell-edge user equipments and the common reference signals; and wherein the power adjustment circuit is configured to increase the initialized power of the common reference signals by a predetermined value as a new initialized power of the common reference signals when load information on control channels of the user equipments in the cell indicates a load higher than a predetermined threshold.

12. The base station of claim 11, wherein the load information on control channels of the user equipments in the cell is represented by a ratio of the number of resource elements for control channels occupied by user equipments to the total number of resource elements for control channels available to user equipments.

13. The base station of claim 11, wherein the power adjustment circuit is configured to adjust the initialized power within a maximum available power constraint for downlink transmission, an upper bound constraint on the power of the PDCCH for the cell-edge user equipments, and a lower bound constraint on the power of the at least one downlink common channels for the non-cell-edge user equipments.

14. The base station of claim 13, wherein the power adjustment circuit is configured to:

determine the upper bound constraint on the power of the PDCCH for the cell-edge user equipments based on the initialized power of the common reference signals and power requirement of the PDCCH for the cell-edge user equipments;

increase the power of the PDCCH for the cell-edge user equipments gradually until the upper bound constraint on the power of the PDCCH for the cell-edge user equipments is broken;

if the maximum available power constraint for downlink transmission is broken after increasing the power of the PDCCH for the cell-edge user equipments, decrease the power of the at least one downlink common channel for the non-cell-edge user equipments gradually until the lower bound constraint on the power of the at least one downlink common channel for the non-cell-edge user equipments is broken; and if the maximum available power constraint for downlink transmission is still broken after decreasing the power of the at least one downlink common channel for the non-cell-edge user equipments, increase the power of the common reference signals by a predetermined adjustment amount and re-perform the adjusting the initialized power based on the increased power of the common reference signals.

15. The base station of claim 11, wherein the transmitter circuit is configured to:

transmit information on the power allocated to the common reference signals to the user equipments when it is different to power previously allocated to the common reference signals; and/or transmit a measurement configuration for the downlink power allocation to the user equipments in the cell.

* * * * *